(12) United States Patent
Tamegai

(10) Patent No.: US 12,172,606 B2
(45) Date of Patent: Dec. 24, 2024

(54) WIPER DEVICE

(71) Applicant: MITSUBA Corporation, Gunma (JP)

(72) Inventor: Hideki Tamegai, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 18/022,516

(22) PCT Filed: Mar. 31, 2022

(86) PCT No.: PCT/JP2022/016577
§ 371 (c)(1),
(2) Date: Feb. 22, 2023

(87) PCT Pub. No.: WO2023/026570
PCT Pub. Date: Mar. 2, 2023

(65) Prior Publication Data
US 2024/0286581 A1  Aug. 29, 2024

(30) Foreign Application Priority Data
Aug. 25, 2021  (JP) .................. 2021-137054

(51) Int. Cl.
*B60S 1/04* (2006.01)
*B60S 1/24* (2006.01)

(52) U.S. Cl.
CPC ........... *B60S 1/0436* (2013.01); *B60S 1/0433* (2013.01); *B60S 1/0441* (2013.01); *B60S 1/0447* (2013.01); *B60S 1/045* (2013.01); *B60S 1/24* (2013.01)

(58) Field of Classification Search
CPC .... B60S 1/0413; B60S 1/0436; B60S 1/0438; B60S 1/0441; B60S 1/0444; B60S 1/0447; B60S 1/045; B60S 1/0433; B60S 1/24
(Continued)

(56) References Cited

U.S. PATENT DOCUMENTS

2013/0174368 A1  7/2013 Mildner et al.
2014/0250622 A1*  9/2014 Tajima .................. B60S 1/245
15/250.31

FOREIGN PATENT DOCUMENTS

DE  102007047126 A1 *  4/2009  ............. B60S 1/045
DE  102015215544 A1 *  2/2017  ............. B60S 1/045
(Continued)

OTHER PUBLICATIONS

Machine translation of description portion of German publication 102007047126, published Apr. 2009. (Year: 2009).*
(Continued)

*Primary Examiner* — Gary K. Graham
(74) *Attorney, Agent, or Firm* — JCIPRNET

(57) ABSTRACT

A first pivot shaft 2*a* and a second pivot shaft 2*b* linked with wiper arms; a driving part, rotationally driving the first pivot shaft; a linking part, linked with the second pivot shaft and the driving part, and rotationally driving the two pivot shafts synchronously; and a first holding member 12*a* and a second holding member 12*b* for fixing the respective pivot shafts to a vehicle body are provided. The second holding member 12*b* includes: a body part 20, rotatably supporting the second pivot shaft 2*b*; and three support parts 21, 22, 23, protruding from the body part 20. The first support part 22 and the third support part 23 in the three support parts 21, 22, 23 include fixed parts 30 fixed via bolts 105 and engagement pins 38 provided in the fixed parts 30 and engaged with the vehicle body.

9 Claims, 9 Drawing Sheets

(58) Field of Classification Search
USPC .................. 15/250.3, 250.31; 296/96.15
See application file for complete search history.

(56) References Cited

FOREIGN PATENT DOCUMENTS

| EP | 1975019 A2 * | 10/2008 | ............ B60S 1/0433 |
|----|---|---|---|
| JP | 2010179762 | 8/2010 | |
| JP | 2011105098 | 6/2011 | |
| JP | 2013230711 | 11/2013 | |
| JP | 2019092387 | 6/2019 | |
| JP | 2019182043 | 10/2019 | |
| WO | WO-2015158850 A1 * | 10/2015 | .............. B60S 1/043 |

OTHER PUBLICATIONS

Machine translation of description portion of German publication 102015215544, published Feb. 2017. (Year: 2017).*
"International Search Report (Form PCT/ISA/210) of PCT/JP2022/016577," mailed on Jun. 21, 2022, pp. 1-3.

* cited by examiner

WIPER DEVICE

CROSS-REFERENCE TO RELATED APPLICATION

This application is a 371 application of the International PCT application serial no. PCT/JP2022/016577, filed on Mar. 31, 2022, which claims the priority benefits of Japan Patent Application No. 2021-137054, filed on Aug. 25, 2021. The entirety of each of the above-mentioned patent applications is hereby incorporated by reference herein and made a part of this specification.

TECHNICAL FIELD

The invention relates to a wiper device.

RELATED ART

A wiper device used in a vehicle includes: a wiper motor; a link mechanism transmitting a rotational force of the wiper motor; a pivot shaft, in which one end is connected to the link mechanism, and an other end fixes a wiper arm; and a holding member, configured to fix the pivot shaft to a vehicle body. It is often that a total of two wiper arms on the driver's side and the passenger's side are provided. Correspondingly, the pivot shafts, the link mechanisms, and the holding members are also provided on the driver's side and the passenger's side.

The two link mechanisms are linked by a rod. Accordingly, through the rod and the two link mechanisms, the rotational force of the wiper motor is transmitted to the two pivot shafts. In addition, the wiper arm on the driver's side and the wiper arm on the passenger's side are driven synchronously.

Here, it may also be that the two pivot shafts are linked by a pipe different from the rod, and the two pivot shafts are firmly integrated. Meanwhile, it may also be that the pipe is omitted and the two pivot shafts are only linked by the rod. In such case, the number of parts of the wiper device as well as the weight thereof can be reduced.

PRIOR ART DOCUMENTS

Patent Documents

[Patent Document 1] Japanese Laid-open No. 2010-179762

SUMMARY OF INVENTION

Technical Problem

However, according to the above conventional art, in the case where the pipe linking the two pivot shafts is omitted, when the holding members are assembled to the vehicle body, the respective holding members may rotate with respect to the rod. Therefore, it is possible that when one of the holding members is being assembled, the position of the other holding member is significantly displaced. Thus, it may be difficult to accurately assemble the holding members within a short time.

Besides, in the case where the vehicle body is inclined, it is possible that when one of the holding members is being fixed to the vehicle body, the other holding member is moved due to its own weight. Therefore, it may be even more difficult to assemble the holding members to the vehicle body.

Thus, the invention provides a wiper device in which the holding members can be assembled accurately within a short time.

Solution to Problem

In order to solve the above issue, a wiper device according to the invention includes: two pivot shafts, respectively linked with wiper arms; a driving part, rotationally driving a first pivot shaft of the two pivot shafts; a linking part, linked with a second pivot shaft of the two pivot shafts and the driving part, and rotationally driving the two pivot shafts synchronously; and two holding members for fixing the respective pivot shafts to a vehicle body. At least one of the two holding members includes: a body part, rotatably supporting the pivot shaft; and a plurality of support parts, protruding from the body part. At least two of the support parts include: fixed parts, fixed to the vehicle body via fixing members; and engagement claws, provided at the fixed parts and engaged with the vehicle body.

Another wiper device according to the invention includes: two pivot shafts, respectively linked with wiper arms; a driving part, rotationally driving a first pivot shaft of the two pivot shafts; a linking part, linked with a second pivot shaft of the two pivot shafts and the driving part, and rotationally driving the two pivot shafts synchronously; and two holding members for fixing the respective pivot shafts to a vehicle body. At least one of the two holding members includes: a body part, rotatably supporting the pivot shaft; and a plurality of support parts, protruding from the body part. At least two of the support parts are provided with fixed parts, the fixed parts protrude from the body part along a direction intersecting with an axial direction of the pivot shaft and are fixed to the vehicle body via fixing members, in the respective fixed parts, insertion holes for insertion of the fixing members are respectively formed, and the respective insertion holes differ in size.

Effects of Invention

According to the invention, before the holding member is fixed to the vehicle body by the fixing member, the holding member can be temporarily fixed to the vehicle body. Therefore, when one of the two holding members is being assembled to the vehicle body, the position of the other holding member can be prevented from being displaced. Accordingly, the holding member can be accurately assembled within a short time for the wiper device.

DESCRIPTION OF EMBODIMENTS

In the following, the embodiments of the invention will be described based on the drawings.

<Vehicle>

Figure 1:
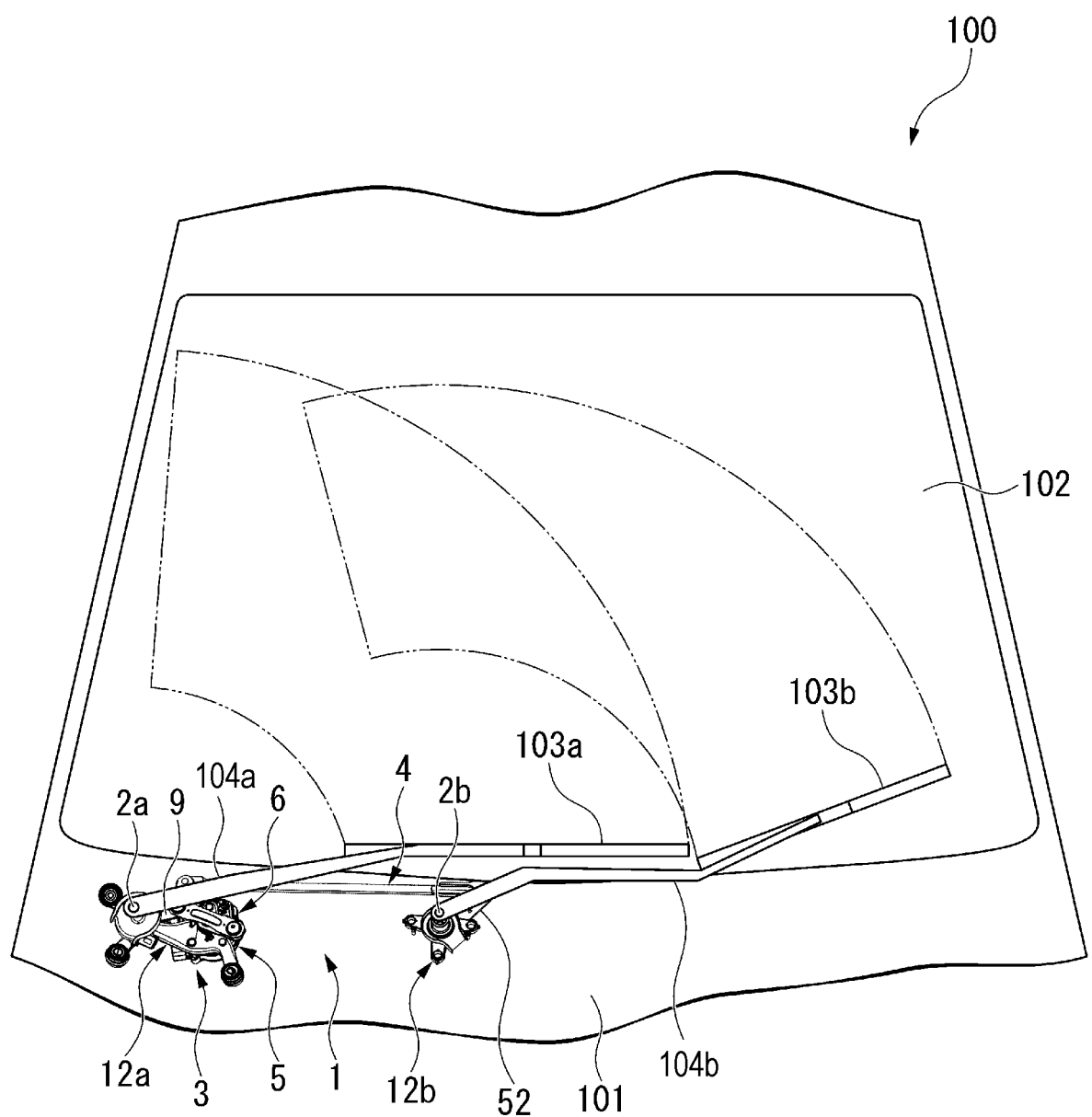
FIG. 1 is a front view illustrating a vehicle according to an embodiment of the invention.

FIG. 1 is a front view illustrating a vehicle 100 including a wiper device 1. In the following description, upper and lower sides in the gravity direction may be simply referred to as upper direction and lower direction. In addition, in the vehicle 100, the driver's seat is on the right side.

As shown in FIG. 1, the vehicle 100 includes a first wiper blade 103a and a second wiper blade 130b for wiping a front glass 102.

The first wiper blade 103a is installed to a tip end of a first wiper arm 104a. The first wiper blade 103a is biased toward the side of the front glass 102 by using a spring (not shown) installed in the first wiper arm 104a.

The second wiper blade 103b is installed to a tip end of a second wiper arm 104b. The second wiper blade 103b is biased toward the side of the front glass 102 by using a spring (not shown) installed in the second wiper arm 104b.

The base end of each of the wiper arms 104a, 104b is installed to the wiper device 1 fixed to a vehicle body 101 of the vehicle 100. The wiper device 1 causes the wiper arms 104a, 104b to perform a wiping operation by driving the wiper arms 104a, 104b respectively.

The wiping pattern of the wiper device 1 is the so-called tandem type in which respective pivot shafts 2a, 2b (details of which will be described in the following) supporting the respective wiper arms 104a, 104b are arranged on an outer side in the vehicle width direction, that is, on the side of the driver's seat in the front glass 102, and at the center in the vehicle width direction (the side of the passenger's seat). The wiper arms 104a, 104b are respectively driven by the wiper device 1 to swing in the same direction between an upper reversing position and a lower reversing direction, thereby wiping the front glass 102.

<Wiper Device>

Figure 2:
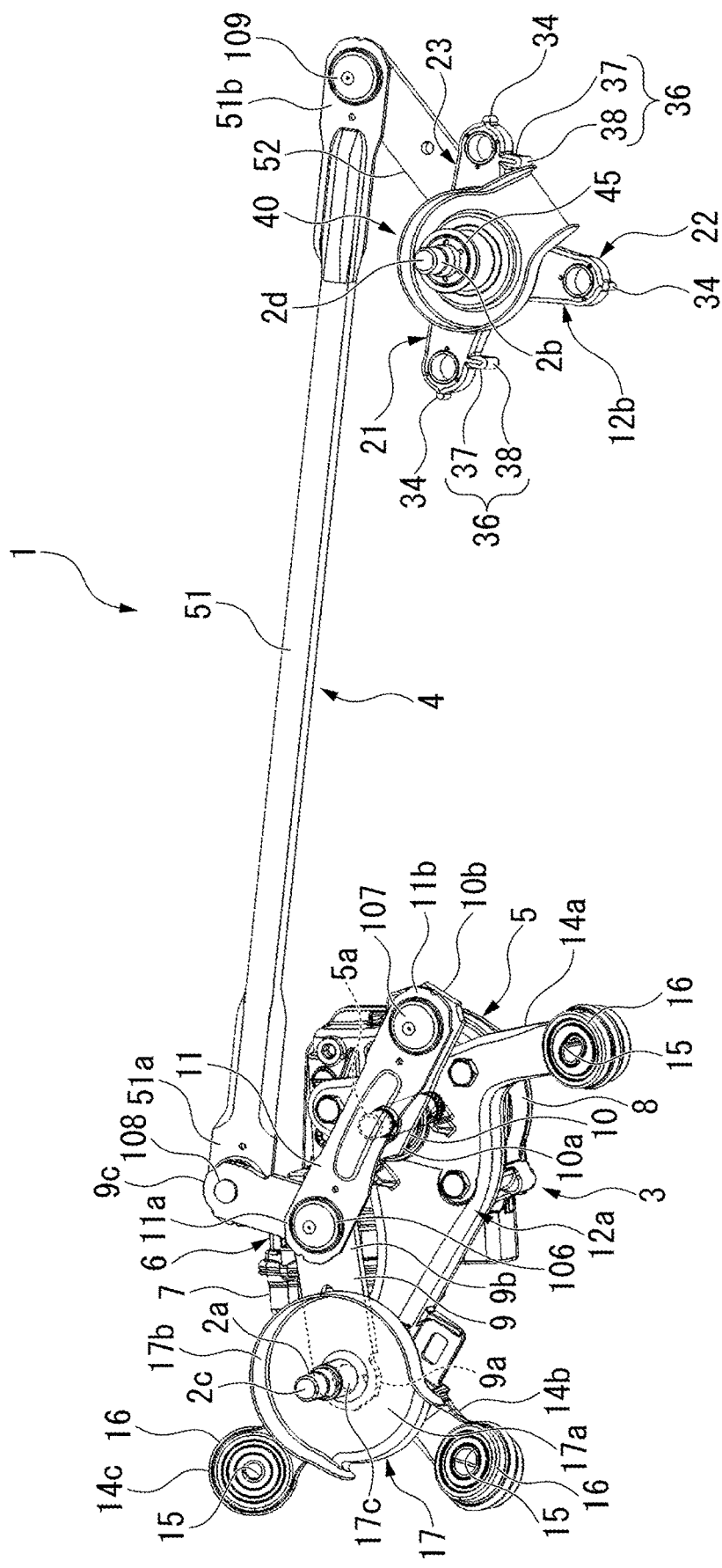
FIG. 2 is a perspective view illustrating a wiper device according to the embodiment of the invention.

FIG. 2 is a perspective view illustrating the wiper device 1. In the following description of the wiper device 1, the top (upper side) or the bottom (lower side) refers to the orientation in the state in which the wiper device 1 is attached to the vehicle body 101.

As shown in FIG. 2, the wiper device 1 includes a first pivot shaft 2a and a second pivot shaft 2b respectively connected to the base ends of the wiper arms 104a, 104b, a driving part 3 rotationally driving the first pivot shaft 2a, a linking part 4 linking the driving part 3 and the second pivot shaft 2b, and a first holding member 12a and a second holding member 12b respectively fixing the pivot shafts 2a, 2b to the vehicle body 101.

The first pivot shaft 2a is disposed below the front glass 102 and on the outer side in the vehicle width direction on the side of the driver's seat. The axial direction of the first pivot shaft 2a is along a normal direction of the front glass 102. The base end of the first wiper arm 104a is linked with a tip end 2c of the first pivot shaft 2a on the vehicle outer side in the axial direction, that is, the upper side (the front side of the paper surface in FIG. 2).

The second pivot shaft 2b is disposed below the front glass 102 and at the center in the vehicle width direction (on the side of the passenger's seat). The axial direction of the second pivot shaft 2b is along a normal direction of the front glass 102. That is, the second pivot shaft 2b is parallel to the first pivot shaft 2a. The base end of the second wiper arm 104b is linked with a tip end 2d of the second pivot shaft 2b on the vehicle outer side in the axial direction, that is, the upper side (the front side of the paper surface in FIG. 2).

<Driving Part>

The driving part 3 includes a motor 5 with a decelerator having an output shaft 5a and a first link member 6 linking the output shaft 5a and the first pivot shaft 2a.

The motor 5 with the decelerator includes a motor part 7 and a deceleration part 8 decelerating the rotation of the motor part 7 for output. A servo motor, for example, is used for the motor part 7.

The deceleration part 8 has, for example, a worm deceleration mechanism. A worm shaft (not shown) of the deceleration part 8 is linked with a motor shaft (not shown) of the motor part 7. A worm wheel (not shown) is provided so as to be meshed with the warm shaft. The output shaft 5a is provided coaxially with the worm wheel and rotated integrally with the worm wheel. The axial direction of the output shaft 5a is parallel to the axial direction of the first pivot shaft 2a. In the following, the axial directions of the output shaft 5a, the first pivot shaft 2a, and the second pivot shaft 2b are simply referred to as the axial direction.

The first link member 6 includes: a first link arm 9 in which an end 9a is relatively unrotatably linked with the first pivot shaft 2a; a second link arm 10, in which an end 10a is relatively unrotatably linked with the output shaft 5a of the motor 5 with the decelerator; and a third link arm 11 linking the first link arm 9 and the second link arm 10.

The first link arm 9 is a plate member formed in a V shape when viewed from the axial direction. The second link arm 10 and the third link arm 11 are plate members formed in a rectangular shape elongated in a direction when viewed from the axial direction. With such configuration, an end 11a of the third link arm 11 is rotatably linked with a bent part 9b of the first link arm 9 via a support pin 106. An other end 11b of the third link arm 11 is rotatably linked with an other end 10b of the second link arm 10 via a support pin 107. Accordingly, the rotation of the output shaft 5a is transmitted to the first pivot shaft 2a via the first link member 6.

<First Holding Member>

The first holding member 12a supports the first pivot shaft 2a. In addition, the first holding member 12a has a base part 13 supporting the motor 5 with the decelerator. The base part 13 is a plate member elongated in the vehicle width direction to be parallel to the vehicle body 101. The motor 5 with the decelerator is supported on the side of the first pivot shaft 2b (the central side in the vehicle width direction) in the base part 13. The motor 5 with the decelerator is disposed on the side of the vehicle body 101 in the base part 13. The output shaft 5a of the motor 5 with the decelerator protrudes toward a side opposite to the vehicle body 101 via the base part 13.

A cylindrical first body part (not shown) provided along the axial direction is provided on a side opposite to the first pivot shaft 2b in the base part 13. The first pivot shaft 2b is rotatably supported by the body part. An end of the first link arm 9 is relatively unrotatably linked with the place protruding toward the side opposite to the vehicle body 101 from the first body part.

In addition, three support parts 14a, 14b, 14c (first support part 14a, second support part 14b, third support part 14c) are integrally formed on the outer circumference of the base part 13. In the three support parts 14a, 14b, 14c, the first support part 14a is disposed on the side (central side in the vehicle width direction) of the first pivot shaft 2b in the base part 13. In the three support parts 14a, 14b, 14c, the second support part 14b and the third support part 14c are disposed on the outer circumference of the first body part (not shown). Each of the support parts 14 a, 14 b, 14 c protrudes outward from the outer circumference of the base part 13 or the outer circumferential surface of the first body part substantially along the surface direction of the base part 13.

A bolt insertion hole 15 for insertion of a bolt (not shown) is formed at the tip part of each of the support parts 14a, 14b, 14c. A mount rubber 16 is mounted to each of the bolt insertion hole 15.

At places corresponding to the bolt insertion holes 15 of the respective support parts 14a, 14b, 14c in the vehicle body 101, female screw parts (not shown) are formed. The bolts inserted into the bolt insertion holes 15 from the top of the respective support parts 14a, 14b, 14c are screwed into the female screw parts. Accordingly, the first holding member 12a is fastened and fixed to the vehicle body 101.

A first pivot cover 17 is installed to an end 2c on the tip side with respect to the first link arm 9 in the first pivot shaft 2a rotatably supported by the first holding member 12a. The first pivot cover 17 is integrally formed by a cover body 17a in a circular plate shape and a wall part 17b standing toward a side opposite to the vehicle body 101 from the outer circumference of the cover body 17a. A cylindrical insertion part 17c inserted by the first pivot shaft 2a is integrally formed at the redial center of the cover body 17a.

With such configuration, the first pivot cover 17 prevents rainwater, etc., from entering the wiper device 1 via the first pivot shaft 2a.

<Second Holding Member>

Figure 3:
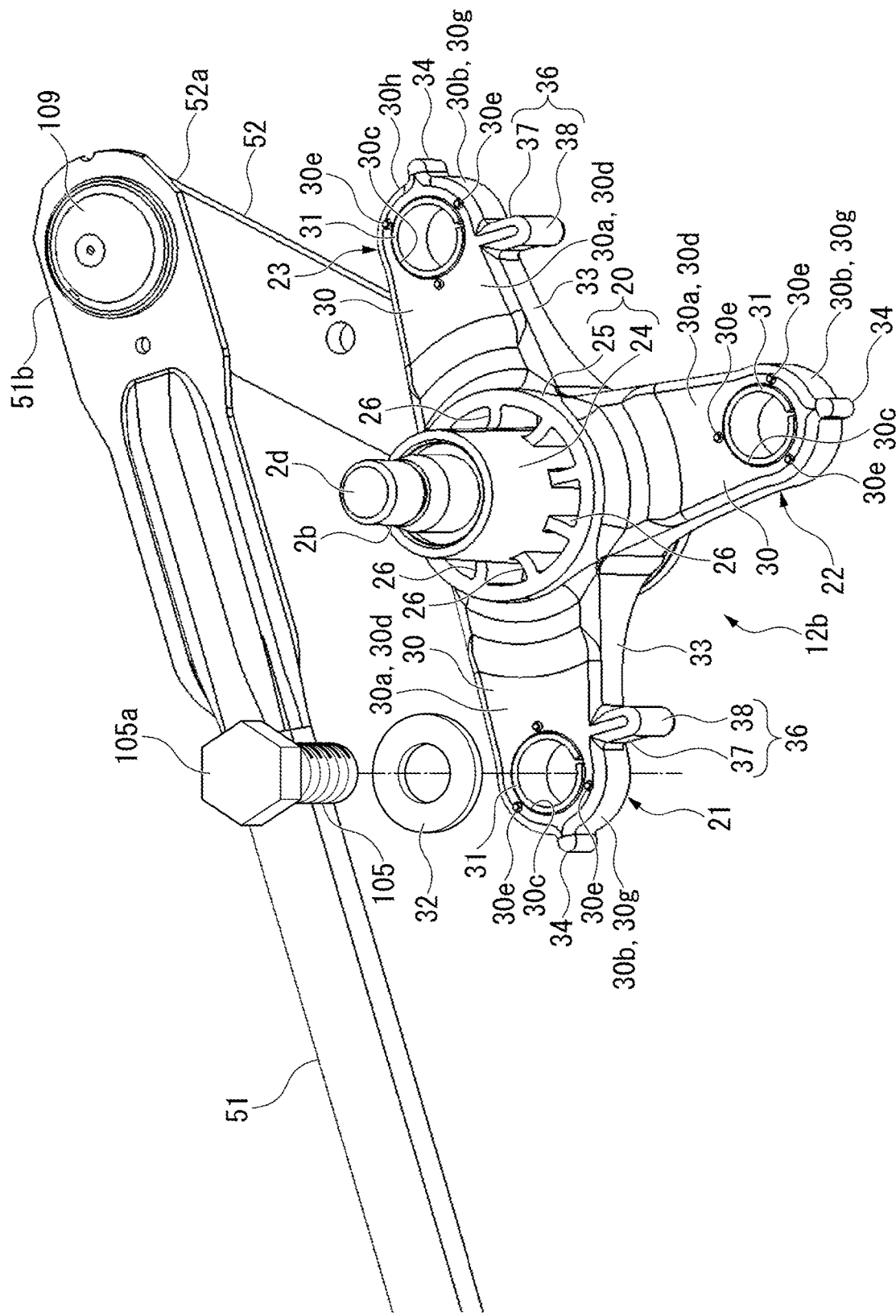
FIG. 3 is a perspective view illustrating a second holding member according to the embodiment of the invention.
Figure 4:
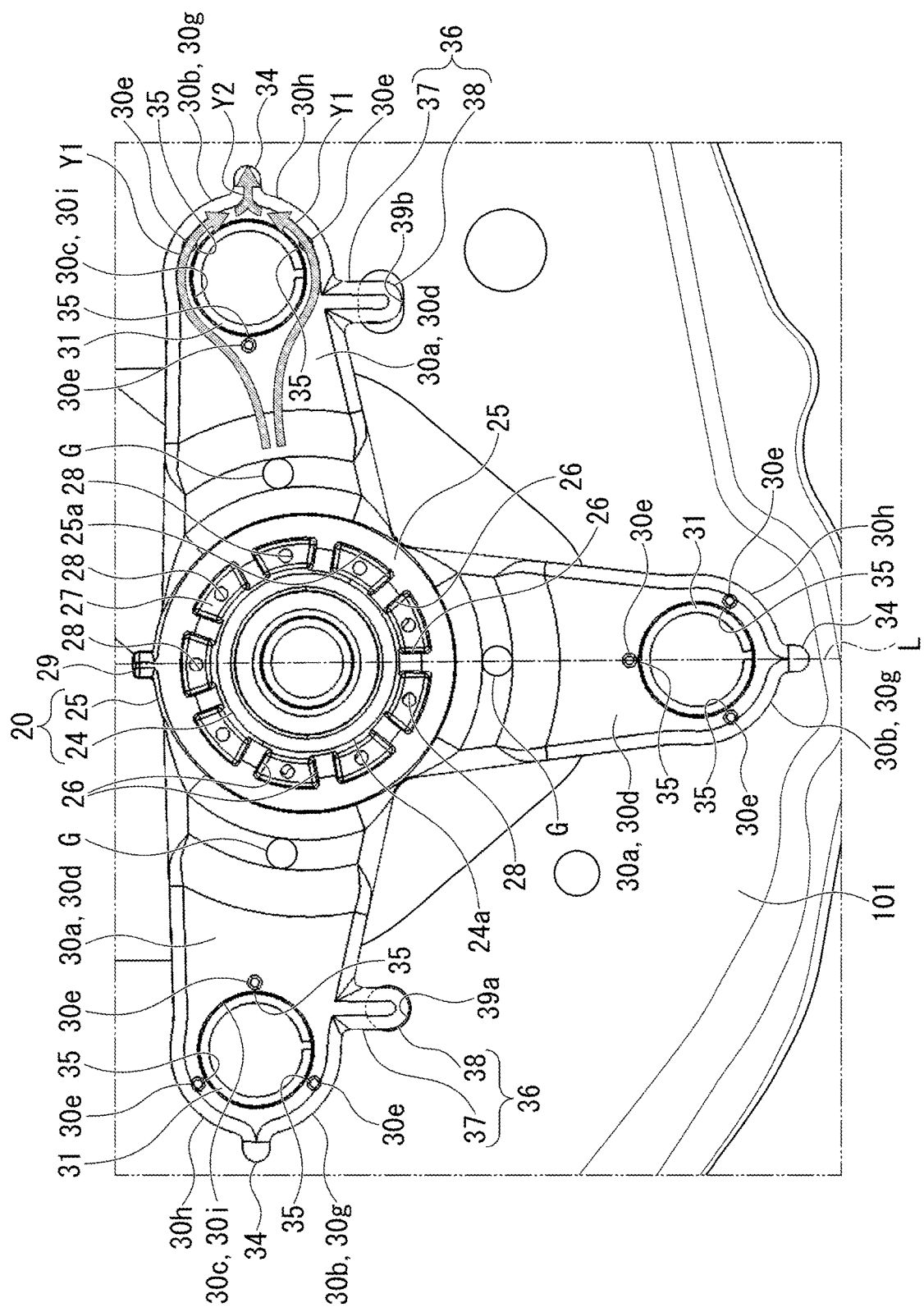
FIG. 4 is a plan view illustrating the second holding member according to the embodiment of the invention, when viewed from the top along an axial direction.
Figure 5:
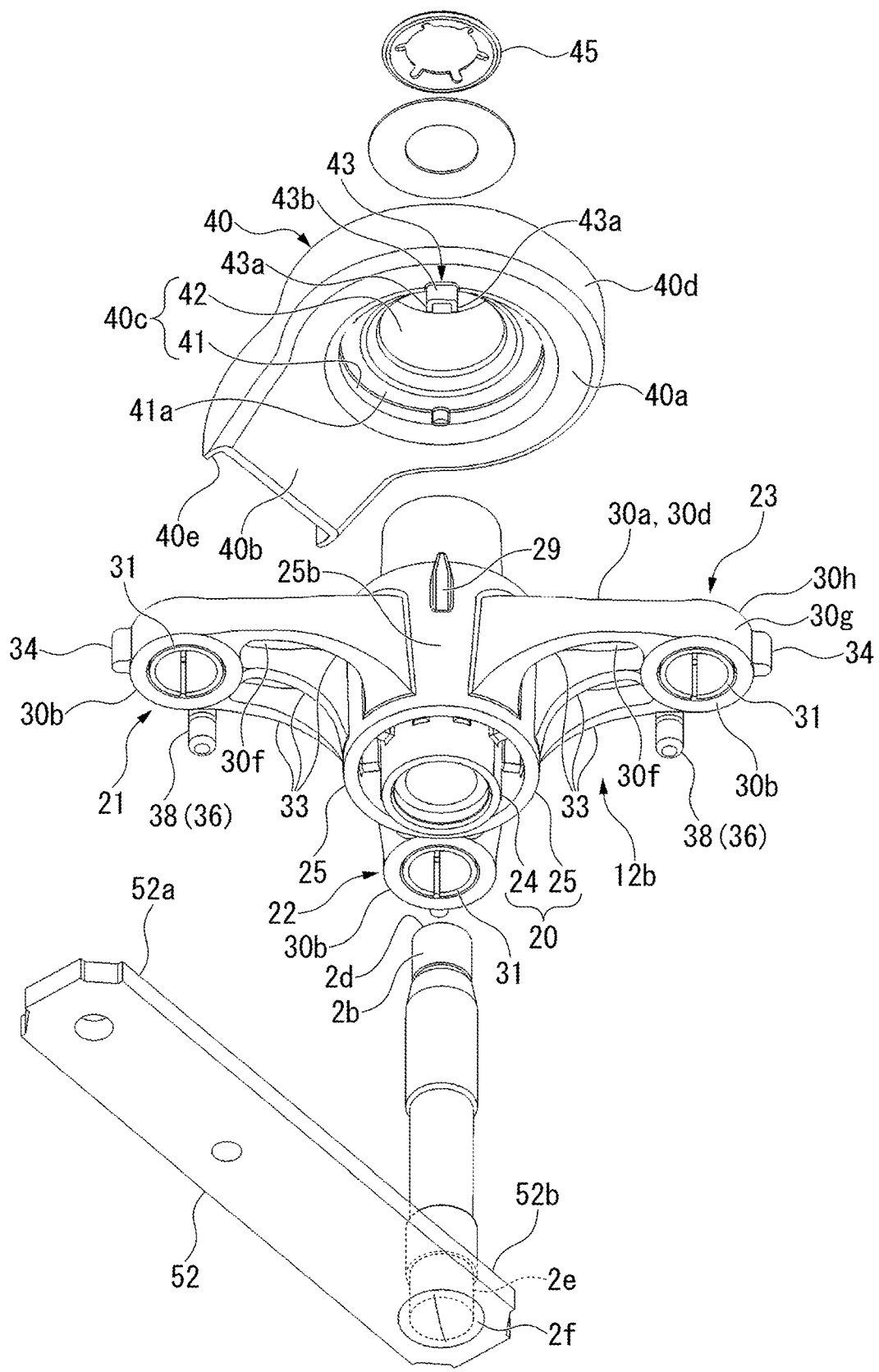
FIG. 5 is an exploded perspective view illustrating the second holding member, a second pivot shaft, and a portion of a linking part according to the embodiment of the invention.

FIG. 3 is a perspective view illustrating the second holding member 12b. FIG. 4 is a plan view illustrating the second holding member 12b when viewed from the top along the axial direction. FIG. 5 is an exploded perspective view illustrating the second holding member 12, the second pivot shaft 2b, and a portion of the linking part 4. In the following description about the second holding member 12b, the expressions such as radial (radial direction), circumferential (circumferential direction), etc., are simply used to respectively refer to the radial direction and the circumferential direction of the second pivot shaft 2b.

As shown in FIGS. 3 to 5, in the second holding member 12, a body part 20 rotatably supporting the second pivot shaft 2b, three support parts 21, 22, 23 (first support part 21, second support part 22, third support part 23) protruding from the body part 20 toward the radially outer side are integrally formed. The second holding member 12b is made of resin, and is formed by injection molding, for example.

The body part 20 includes an inner cylindrical part 24 rotatably supporting the second pivot shaft 2b and an outer cylindrical part 25 formed to surround the periphery of the inner cylindrical part 24. The outer cylindrical part 25 is disposed concentrically with the inner cylindrical part 24. The axial length of the outer cylindrical part 25 is shorter than the axial length of the inner cylindrical part 24. Multiple (e.g., 9 as in the embodiment) ribs 26 linked with an inner circumferential surface 25a of the outer cylindrical part 25 and an outer circumferential surface 24a of the inner cylindrical part 24 are integrally formed on the inner circumferential surface 25a of the outer cylindrical part 25.

The ribs 26 are formed throughout the entire axial direction of the inner circumferential surface 25a in the outer cylindrical part 25. The rib 26 is a plate member along the radial direction when viewed from the axial direction. The ribs 26 are disposed at equal intervals along the circumferential direction. In addition, on the inner circumferential surface 25a of the outer cylindrical part 25, an intermediate plate 27 linked with the inner circumferential surface 25a and the outer circumferential surface 24a of the inner cylindrical part 24 is integrally formed at the axial center.

The intermediate plate 27 is formed throughout the entire circumference. By using the intermediate plate 27, the space between the inner cylindrical part 24 and the outer cylindrical part 25 is partitioned. In the intermediate plate 27, a drain hole 28 penetrating in the axial direction is formed at the center between adjacent ribs 26 in the circumferential direction. The drain hole 28 drains rainwater, etc., entering between the inner cylindrical part 24 and the outer cylindrical part 25 downward.

In addition, on the outer circumferential surface 25b of the outer cylindrical part 25, a fitting convex part 29 is formed at an axially upper part. The fitting convex part 29 is formed in a rectangular parallelepiped shape elongated in the axial direction. The fitting convex part 29 is fit with a second pivot cover 40 to be described afterwards. The fitting convex part 29 positions the second pivot cover 40 with respect to the second holding member 12b.

The three support parts 21, 22, 23 protrude from the outer circumferential surface 25b of the outer cylindrical part 25 toward the radially outer side. In the three support parts 21, 22, 23, the first support part 21, the second support part 22, and the third support part 23 are arranged and disposed in order in the circumferential direction to avoid the fitting convex part 29. In the following description about the three support parts 21, 22, 23, the same shape is labeled with the same reference symbol for the ease of description.

The three support parts 21, 22, 23 have fixed parts 30 protruding from the outer circumferential surface 25b of the outer cylindrical part 25 along the radial direction. The fixed part 30 has a base part 30a in a plate shape whose thickness direction conforms to the axial direction. The base part 30a is formed to be elongated in the radial direction. The base part 30 is formed to be slightly tapered from the outer circumferential direction 25b of the outer cylindrical part 25 toward the radially outer side end.

In the three support parts 21, 22, 23, the fixed part 30 of the first support part 21 and the fixed part 30 of the third support part 23 are disposed so that the respective base parts 30a sandwich the body part 20 to face each other. The fixed part 30 of the first support part 21 and the fixed part 30 of the third support part 23 are disposed so that the longitudinal directions thereof on the same line.

In the three support parts 21, 22, 23, the fixed part 30 of the second support part 22 is disposed to sandwich the body part 20 to face the fitting convex part 29 of the outer cylindrical part 25. The interval between the first support part 21 and the second support part 22 in the circumferential direction is the same as the interval between the second support part 22 and the third support part 23 in the circumferential direction.

An injection gate mark G is formed at the center in the circumferential direction at an end part of the base part 30a on the side of the outer cylindrical part 25. The injection gate mark G is a resin injection mark formed during injection molding of the second holding member 12b.

A fixing tube 30b in a cylindrical shape is formed to protrude downward at a radial side end of the base part 30a. The axial direction of the fixing tube 30b conforms to the axial direction of the second pivot shaft 2b (the body part 20).

The radially outer side end of the base part 30a is provided with an arced part 30h formed in an arced shape when viewed from the axial direction, so as to correspond to the shape of the fixing tube 30b. An insertion hole 30c in communication with the fixing tube 30b is formed in the base part 30a. Three protrusions 30e are formed on the periphery of the insertion hole 30c on an upper surface 30d (the surface on a side opposite to the fixing tube 30b) of the base part 30a. The three protrusions 30e are disposed at equal intervals in the circumferential direction. The protrusions 30e serve to avoid rattling at the time of fixing the second holding member 12b to the vehicle body 101 (details in this regard will be described subsequently).

On a lower surface 30f of the base part 30a, three ribs 33 are formed to protrude downward. The three ribs 33 cross the fixing tube 30b and the outer circumferential surface 25b of the outer cylindrical part 25. Two of the three ribs 33 are disposed on the side edges of the base part 30a in the circumferential direction. The remaining rib 33 is provided at the center between the two ribs 33.

The lower end of each rib 33 is formed in an arced shape so that the tip is tapered toward the fixing tube 30b when viewed from the circumferential direction. The position of the lower end of each rib 33 at the end part on the side of the fixing tube 30b conforms to the position of the lower end of the fixing tube 30b.

On an outer circumferential surface 30g of the fixing tube 30b, a convex part 34 is formed at a place (the radially outermost side of each of the support parts 21, 22, 23) corresponding to the center of the arched part 30h formed in the base part 30a. The convex part 34 and the injection gate mark G are provided at the two ends of the base part 30a in the axial direction and face each other in the radial direction. The convex part 34 is formed across the entire axial direction of the fixing tube 30b. The convex part 34 protrudes toward a side opposite to the outer cylindrical part 25. The convex part 34 serves to suppress the occurrence of a weld during the injection molding of the second holding member 12b (details in this regard will be described subsequently).

Figure 6:
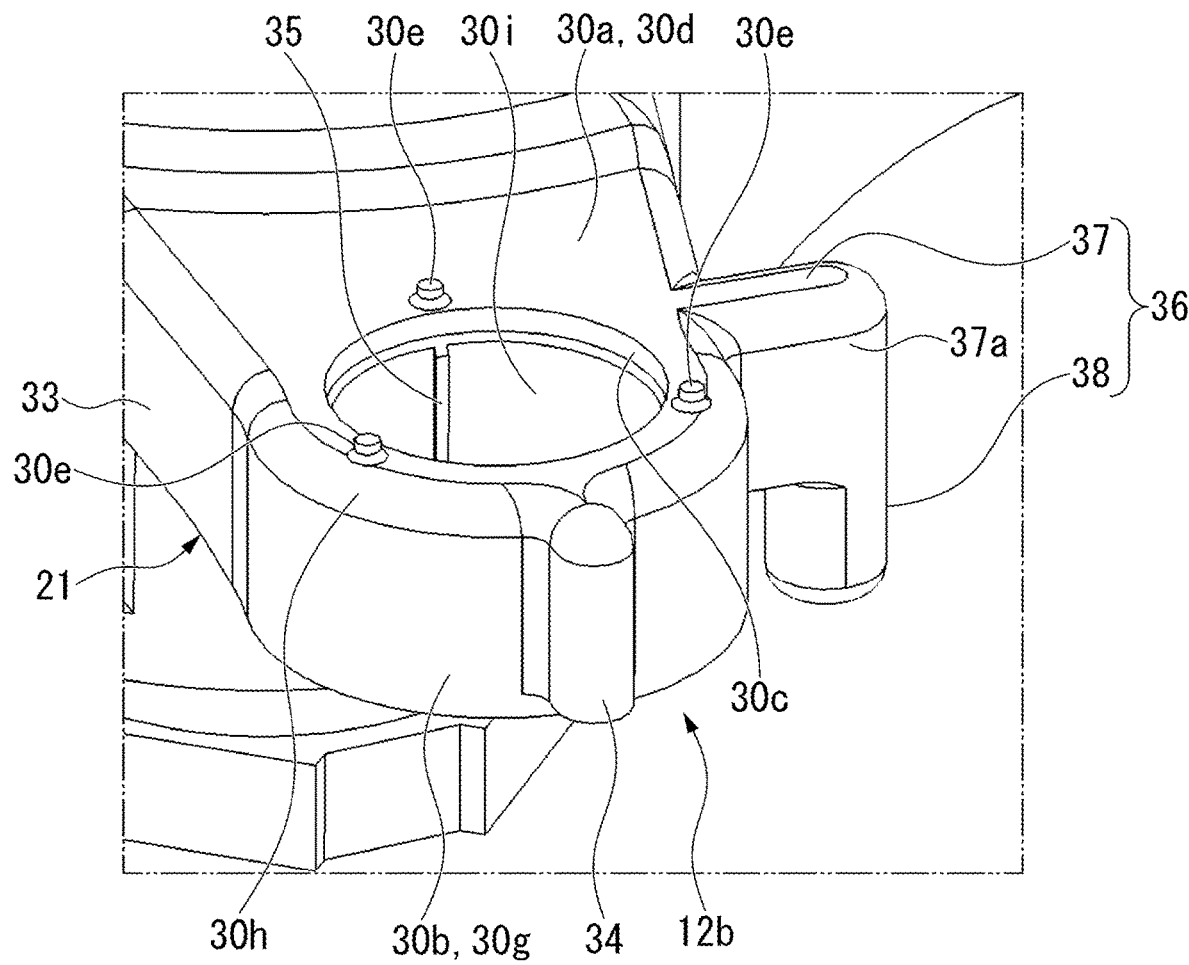
FIG. 6 is an enlarged perspective view in the vicinity of a fixing tube according to the embodiment of the invention.

FIG. 6 is an enlarged perspective view in the vicinity of the fixing tube 30b in the first support part 21.

As shown in FIGS. 3 to 6, three press-fit ribs 35 are formed on an inner circumferential surface 30i of the fixing tube 30b in each fixed part 30. The press-fit rib 35 is formed throughout the entire axial direction of the fixing tube 30b. The press-fit ribs 35 are disposed at equal intervals in the circumferential direction, so as to correspond to the protrusions 30e formed in the base part 30a. The press-fit ribs 35 hold a collar 31 to be described subsequently to the fixing tube 30b.

The collar 31 is pressed into the inner circumferential surface 30i of the fixing tube 30b. The collar 31 slightly protrudes from the upper surface of the base part 30a. The protrusion height substantially conforms to the protrusion height of the protrusion 30e formed in the base part 30a.

A bolt 105 (an example of the fixing member) is inserted into the collar 31. The bolt 105 fixes the second holding member 12b to the vehicle body 101. A flat washer 32 is interposed between a head part 105a of the bolt 105 and the base part 30a.

Vehicle body engagement parts 36 are integrally formed with the fixed part 30 of the first support part 21 and the fixed part 30 of the third support part 23 among the three support parts 21, 22, 23. The vehicle engagement part 36 is disposed at the rib 33 (an example of the side surface on the side of the second support part) closest to the side of the second support part 22 in the fixed part 30 of the first support part 21. The vehicle body engagement part 36 is disposed near the fixing tube 30b of the rib 33.

In addition, the vehicle engagement part 36 is disposed at the rib 33 (an example of the side surface on the side of the second support part) closest to the side of the second support part 22 in the fixed part 30 of the third support part 23. The vehicle body engagement part 36 is disposed near the fixing tube 30b of the rib 33. The vehicle body engagement parts 36 temporarily fix to the second holding member 12b of the vehicle body 101.

The vehicle body engagement part 36 includes a leg part 37 each integrally formed near the fixing tube 30b of the rib 33 and an engagement pin 38 (an example of the engagement claw and the pin part) integrally formed with the leg part 37. The leg part 37 protrudes toward the side of the second support part 22 from the upper part of each rib 33. The engagement pin 38 is integrally formed with a tip end 37a (an example of the end part on the outer side), which is an end part of the leg part 37 in the protruding direction.

The leg part 37 is formed in a rectangular parallelepiped shape. The protruding direction of the leg part 37 from the rib 33 is orthogonal to the axial direction along the normal direction of the rib 33. The engagement pin 38 is formed in a circular columnar shape and protrudes downward with respect to the leg part 37. The engagement pin 38 protrudes downward with respect to the fixing tubes 30b of the first support part 21 and the third support part 23.

In this way, the second holding member 12b is formed to be line symmetric with respect to a line L formed by connecting the center of the body part 20 in the radial direction (the axial center of the second pivot shaft 2b) and the center of the fitting convex part 29 (the second support part 22) in the circumferential direction.

At places corresponding to the fixing tubes 30b of the respective support parts 21, 22, 23 in the vehicle body 101, female screw parts (not shown) are formed. The bolts 105 inserted into the fixing tubes 30b and the insertion holes 30c from the top of the respective support parts 21, 22, 23 are screwed into the female screw parts. Accordingly, the second holding member 12b is fastened and fixed to the vehicle body 101.

In the vehicle body 101, at places corresponding to the respective vehicle body engagement parts 36, a first engagement hole 39a (an example of the hole) and a second engagement hole 39b (an example of the hole) are formed. The engagement pin 38 of each vehicle body engagement part 36 is inserted into each of the engagement holes 39a, 39b.

The first engagement hole 39a is formed in a circular shape when viewed from the axial direction. The inner diameter of the first engagement hole 39a is slightly greater than the shaft diameter of the engagement pin 38. The second engagement hole 39b is formed in an elongated circular shape elongated along the vehicle width direction (radial direction). By inserting the respective engagement pins 38 to the engagement holes 39a, 39b, the second holding member 12b is engaged with and temporarily fixed to the vehicle body 101. The effect of the temporary fixing will be described in detail subsequently.

<Second Pivot Cover>

Figure 7:
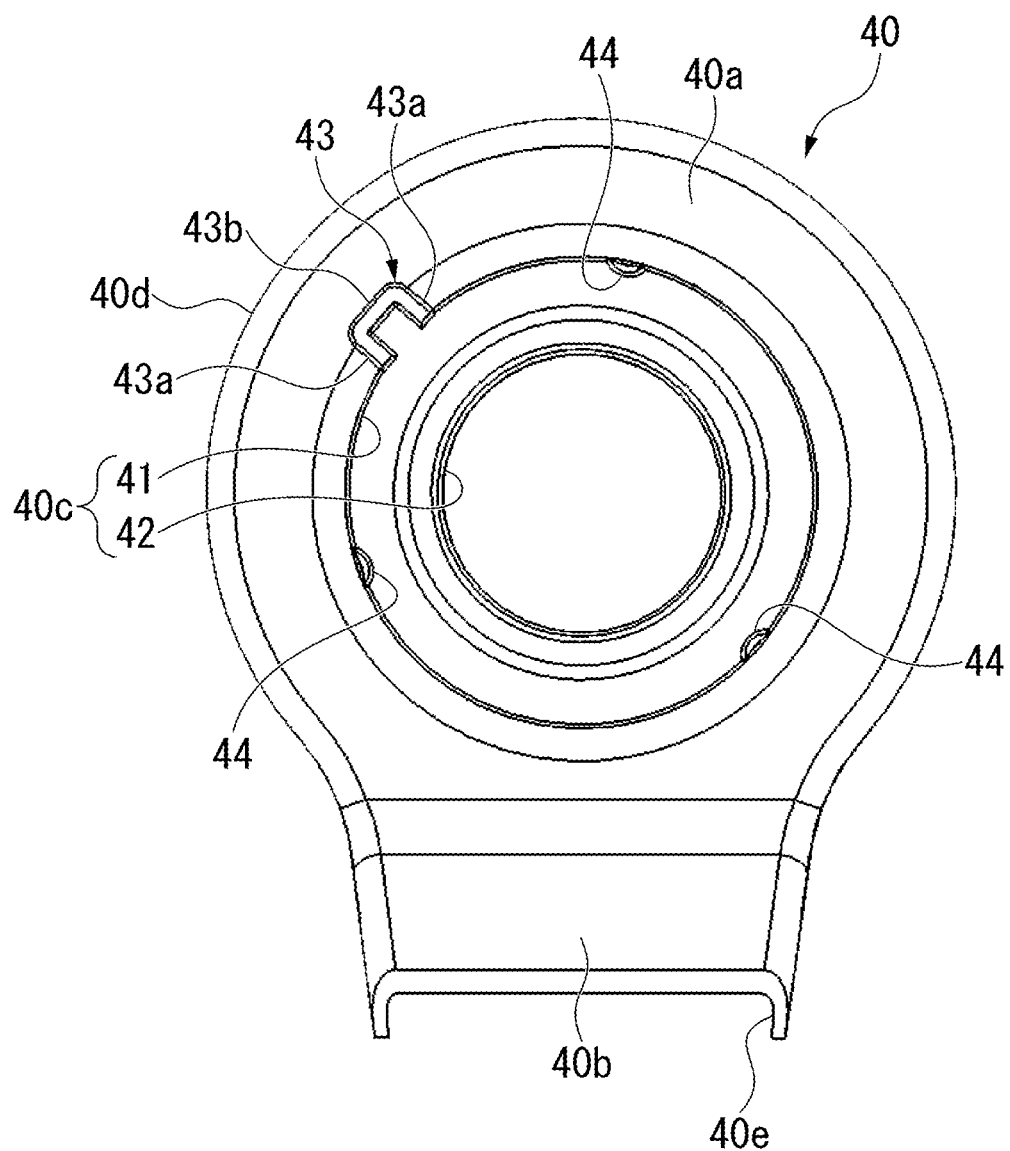
FIG. 7 is a plan view illustrating a second pivot cover according to the embodiment of the invention, when viewed from the bottom.

FIG. 7 is a plan view illustrating the second pivot cover 40 when viewed from the bottom.

As shown in FIGS. 5 and 7, the second pivot cover 40 is mounted to the second holding member 12b from the top. The second pivot cover 40 is mainly formed by a cover body 40a in an annular shape when viewed from the axial direction, a discharge plate 40b extensively formed from a side of the cover body 40a, an insertion part 40c in a stepped cylindrical shape rising upward from the inner circumferential edge of the cover body 40a, and a wall part 40d rising upward from the outer circumferential edge of the cover body 40a and the discharge plate 40b.

The insertion part 40c is integrally formed by a first cylindrical part 41 rising from the cover body 40a and a second cylindrical part 42 formed by reducing the diameter from the upper end of the first cylindrical part 41 via a stepped part 41a. The first cylindrical part 41 is fit with the outer circumferential surface of the outer cylindrical part 25 of the second holding member 12b. That is, the inner diameter of the first cylindrical part 41 is substantially the same as or slightly greater than the outer diameter of the outer cylindrical part 25 of the second holding member 12b. The length of the first cylindrical part 41 in the axial direction is substantially the same as the upward protrusion height in the outer cylindrical part 25 from the respective support parts 21, 22, 23.

Three press-fit ribs 44 are formed on the inner circumferential surface of the first cylindrical part 41. The press-fit ribs 44 are formed throughout the entire axial direction of the first cylindrical part 41, and are disposed at equal intervals in the circumferential direction. The press-fit ribs 35 lightly press and fit the first cylindrical part 41 with the outer circumferential surface of the outer cylindrical part 25.

In the first cylindrical part 41, a fitting part 43 fit with the fitting convex part 29 of the second holding member 12b is integrally formed at a place corresponding to the fitting convex part 29. The fitting part 43 protrudes downward from the first cylindrical part 41. The fitting part 43 is formed in a C shape when viewed from the axial direction, so as to correspond to the shape of the fitting convex part 29. That is, the fitting part 43 has two side walls 43a facing each other in the circumferential direction and an end wall 43b connecting the radially outer side ends of the two side walls 43a.

When the second pivot cover 40 is mounted to the second holding member 12b, at the same time when the first cylindrical part 41 is fit with the outer cylindrical part 25, the fitting part 43 is fit with three side surfaces of the fitting convex part 29. Accordingly, the second pivot cover 40 is positioned and fixed to the second holding member 12b. In addition, since the press-fit ribs 44 are formed on the inner circumferential surface of the first cylindrical part 41, the first cylindrical part 41 is lightly pressed to the outer circumferential surface of the outer cylindrical part 25. Therefore, the second pivot cover 40 is reliably fixed to the second holding member 12b without rattling.

The second cylindrical part 42 is fit with the outer circumferential surface of the inner cylindrical part 24 of the second holding member 12b. That is, the inner diameter of the second cylindrical part 42 is substantially the same as or slightly greater than the outer diameter of the inner cylindrical part 24 of the second holding member 12b. The length of the second cylindrical part 42 in the axial direction is substantially the same as the upward protrusion height in the inner cylindrical part 24 from the outer cylindrical part 25.

The discharge plate 40b is formed in a rectangular shape elongated in the circumferential direction of the cover body 40a when viewed from the axial direction. On the wall part 40d, an opening part 40e is formed on a side of the discharge plate 40b opposite to the cover body 40a.

With such configuration, the second pivot cover 40 prevents rainwater, etc., from entering the wiper device 1 via the second pivot shaft 2b. The rainwater received at the cover body 40a of the second pivot cover 40 is discharged to the outside via the discharge plate 40b and the opening part 40e.

The tip end 2d of the second pivot shaft 2b rotatably supported by the second holding member 12b protrudes upward from the inner cylindrical part 24. A rosette-shaped part 45 is attached to the portion protruding upward, as shown in FIGS. 2 and 5. The rosette-shaped part 45 limits the movement of the second pivot shaft 2b toward the axial direction with respect to the inner cylindrical part 24.

Meanwhile, a base end 2e of the second pivot shaft 2b protrudes downward from the inner cylindrical part 24. The linking part 4 is linked with the portion protruding downward.

<Linking Part>

As shown in FIGS. 2, 3, and 5, the linking part 4 includes a rod 51 in which an end 51a is rotatably linked with an other end 9c of the first link arm 9 via a support pin 108 and a second link member 52 linking an other end 51b of the rod 51 and the base end 2e of the second pivot shaft 2b. The rod 51 is a plate member elongated in the vehicle width direction of the vehicle body 101. More specifically, the cross-sectional shape of the majority of the rod 51 at the center in the longitudinal direction taken along the upper-lower direction is formed in a U shape.

The ends 51a and 51b of the rod 51 are formed in a plate shape parallel to the other end 9c of the first link arm 9.

The second link member 52 is a plate member formed in a rectangular shape elongated in a direction when viewed from the axial direction. An end 52a of the second link member 52 is rotatably supported by the other end 51b of the rod 51 via a support pin 109. An other end 52b of the second link member 52 is relatively unrotatably linked with the base end 2e of the second pivot shaft 2e.

By using a flange part 2f formed at the base end 2e of the second pivot shaft 2b, the second link member 52 can be prevented from coming off from the second pivot shaft 2b. With such configuration, the rotation of the output shaft 5a of the motor 5 with the decelerator is transmitted to the second pivot shaft 2b via the first link member 6, the rod 51, and the second link member 52.

<Regarding the Injection Molding of the Second Holding Member>

Then, based on FIG. 4, the injection molding of the second holding member 12b is described. The second holding member 12b is formed by injecting molten resin into a mold not shown herein. At this time, the molten resin is injected from a gate provided in the mold, and the second holding member 12b is retrieved from the mold after being cured. The position of the gate of the mold remains as a mark (resin injection mark) on the second holding member 12b. The mark is the injection gate mark G.

The molten resin injected from the gate spreads in the mold as shown in FIG. 4. At this time, the molten resin forming the respective support parts 21, 22, 23 flows to the radially outer side ends (tip ends) of the respective support parts 21, 22, 23 by wrapping around the peripheries of the holes of the inner circumferential surfaces 30i of the fixing tubes 30b and the insertion holes 30c of the base parts 30a. In addition, the molten resin is merged at the radially outer side ends of the support parts 21, 22, 23 (see arrows Y1). At the radially outermost side ends of the respective support parts 21, 22, 23 where the molten resin is merged (the center of the arced part 30h formed at the base part 30a and the outer circumferential surface 30g of the fixing tube 30b in the circumferential direction), the convex parts 34 are formed.

Here, in the case where the convex parts 34 are not formed at the radially outermost side ends of the respective support parts 21, 22, 23, the molten resin merged at the radially outermost side ends of the respective support parts 21, 22, 23 has nowhere to go, and the flow of the molten resin deteriorates. As a result, it is difficult for the molten resin to reach the respective corners at the radially outermost side ends of the support parts 21, 22, 23, and a weld may occur. However, by forming the convex parts 34 at the radially outermost side ends of the respective support parts 21, 22, 23, the resin flow at the radially outermost side ends of the respective support parts 21, 22, 23 can be facilitated (see an arrow Y2). Accordingly, the molten resin reaches the respective corners at the radially outermost side ends of the support parts 21, 22, 23, and the occurrence of weld is suppressed.

In addition, the body part 20 is integrally formed by the inner cylindrical part 24 rotatably supporting the second pivot shaft 2b, the outer cylindrical part 25 formed to surround the periphery of the inner cylindrical part 24, and the ribs 26 linked with the inner circumferential surface 25a of the outer cylindrical part 25 and the outer circumferential surface 24a of the inner cylindrical part 24. Therefore, the mechanical strength of the body part 20 can be sufficiently ensured without forming a thick portion throughout the entire body part 20. Since there is no thick portion in the body part 20, thermal sink during resin molding of the body part 20 can be suppressed, and the molding accuracy of the body part 20 is facilitated.

<Assembling Method of the Wiper Device>

In the following, an assembling method of the wiper device 1 is described based on FIGS. 1, 2, and 4.

As shown in FIGS. 1, 2, and 4, firstly, the engagement pin 38 of the first support part 21 in the second support member 12b is inserted into the first engagement hole 39a formed in the vehicle body 101. The engagement pin 38 of the third support part 23 in the second holding member 12b is inserted into the second engagement hole 39b formed in the vehicle body 101. Accordingly, the second holding member 12b is engaged with and temporarily fixed to the vehicle body 101.

Here, the respective engagement pins 38 are integrally formed with the tip ends 37a of the leg parts 37 protruding from the ribs 33 of the first support part 21 and the third support part 23. Therefore, at the time of inserting the engagement pins 38 into the respective engagement holes 39a, 39b of the vehicle body 101, the respective support parts 21, 23 do not affect the operator's view, and the positions of the engagement pins 38 are easily recognized visually. Accordingly, it is easy to insert the engagement pins 38 into the respective engagement holes 39a, 39b.

In the state in which the second holding member 12b is temporarily fixed to the vehicle body 101, by using a bolt not shown herein, the first holding member 12a is fastened and fixed to the vehicle body 101. Specifically, the bolt (not shown) is inserted from the top of the bolt insertion hole 15 of the first holding member 12a. In addition, the bolt is screwed into a female screw part (not shown) formed in the vehicle body 101. Accordingly, the first holding member 12a is fastened and fixed to the vehicle body 101.

The bolt fastening operation at the time of fastening and fixing the first holding member 12a is transmitted, as vibration, to the second holding member 12b via the linking part 4. At this time, since the second holding member 12b is temporarily fixed to the vehicle body 101, the position of the second holding member 12b is not displaced. In addition, the operator is not required to perform the operation of fastening the first holding member 12a to the vehicle body 101 while being concerned that the position of the second holding member 12b is displaced.

Here, the second holding member 12b is engaged to the vehicle body 101 by using two engagement pins 38. Therefore, with simply the engagement pins 38 being inserted into the respective engagement holes 39a, 39b of the vehicle body 101, positional displacements such as rotation of the second holding member 12b around the engagement pins 38, etc., can be reliably prevented.

Then, the second holding member 12b is fastened and fixed to the vehicle body 101 by using the bolts 105. Specifically, the bolts 105 are inserted from the fixing tubes 30b and the insertion holes 30c of the respective support parts 21, 22, 23 in the second holding member 12b. In addition, the bolts 105 are screwed into the female screw parts (not shown) formed in the vehicle body 101.

In the respective engagement holes 39a, 39b of the vehicle body 101, the first engagement hole 39a is formed in a circular shape when viewed from the axial direction. The inner diameter of the first engagement hole 39a is slightly greater than the shaft diameter of the engagement pin 38. Meanwhile, the second engagement hole 39b is formed in an elongated circular shape elongated in the vehicle width direction. Therefore, by using the first engagement hole 39a as a reference hole, a manufacture error of the vehicle body 1 or the wiper device 1 can be absorbed by using the second engagement hole 39b.

Here, at the time of tightening the bolts 105 to the vehicle body 101, an manufacturing error of the collar 31 or the second holding member 12b is absorbed by buckling deformation of the protrusions 30e through the flat washer 32. Accordingly, the rattling at the time of fastening and fixing the second holding member 12b to the vehicle body 101 is prevented. According to the above, the second holding member 12b is fastened and fixed to the vehicle body 101, and the assembling of the wiper device 1 to the vehicle body 101 is completed.

<Operation of the Wiper Device>

Then, an operation of the wiper device 1 is described.

By driving the motor 5 with the decelerator, the output shaft 5a is rotated. The rotation of the output shaft 5a is transmitted to the first pivot shaft 2a via the first link member 6. Accordingly, the first pivot shaft 2a is rotated positively or negatively within a predetermined rotation angle range.

The second pivot shaft 2b is also linked with the first link member 6 via the linking part 4. Therefore, the rotation of the output shaft 5a is also transmitted to the second pivot shaft 2b via the first link member 6, the rod 51, and the second link member 52. Accordingly, the second pivot shaft 2b is rotated positively or negatively within the predetermined rotation angle range.

In this way, with the first link member 6 and the linking part 4, the rotation of the output shaft 5a is simultaneously transmitted to the two pivot shafts 2a, 2b. Therefore, the two pivot shafts 2a, 2b are driven synchronously.

In addition, the first holding member 12a supporting the motor 5 with the decelerator is disposed on the vehicle body 1 via the mount rubber 16. Therefore, the vibration at the time of driving the motor 5 with the decelerator is hardly transmitted to the vehicle body 101.

When the two pivot shafts 2a, 2b are rotated, the respective wiper arms 104a, 104b respectively linked with the tip ends 2c, 2d of the pivot shafts 2a, 2b swing synchronously within a predetermined range on the front glass 102. Accordingly, the front glass 102 is wiped by using the respective wiper blades 103a, 103b attached to the respective wiper arms 104a, 104b.

Accordingly, the wiper device 1 includes two pivot shafts 2a, 2b, the driving part 3 rotationally driving the first pivot shaft 2a, the linking part 4 linked with the driving part 3 and the second pivot shaft 2b and synchronously rotationally driving the two pivot shafts 2a, 2b, and the two holding members 12a, 12b. Unlike the conventional art, the wiper device 1 does not include a pipe different from the rod 51 of the linking part 41 linking the two holding members 12a, 12b.

With such configuration, the second holding member 12b of the two holding member 12a, 12b has three fixed parts 30 (the first support part 21, the second support part 22, and the third support part 23). In the three support parts 21, 22, 23, the vehicle body engagement parts 36 are provided in the first support part 21 and the third support part 23. By using the vehicle body engagement parts 36, the second holding member 12b is engaged with the vehicle body 101.

Therefore, before the two holding members 12a, 12b are fastened and fixed to the vehicle body 101 by using bolts, the second holding member 12b can be temporarily fixed to the vehicle body 101 by using the vehicle body engagement parts 36. Therefore, by firstly performing the engagement process of the first holding member 12a to the vehicle body 101, the position of the second holding member 12b can be prevented from being displaced during the engagement process. Accordingly, the holding member 12a, 12b of the wiper device 1 can be assembled accurately within a short time.

The second holding member 12b is provided with two engagement pins 38. By using the two engagement pins 38, the second holding member 12b is engaged to the vehicle body 101. Therefore, with simply the engagement pins 38 being inserted into the respective engagement holes 39a, 39b of the vehicle body 101, positional displacements such as rotation of the second holding member 12b around the engagement pins 38, etc., can be reliably prevented. Accordingly, the holding member 12a, 12b of the wiper device 1 can be assembled accurately within a short time.

Since the wiper device 1 can be accurately assembled to the vehicle body 101 within a short time, it is possible to make contribution to Goal 7, i.e., "Ensure access to affordable, reliable, sustainable and modern energy for all", and Goal 9, i.e., "Build resilient infrastructure, promote inclusive and sustainable industrialization and foster innovation", in Sustainable Development Goals (SDGs) led by the United Nations.

The driving part 3 includes the motor 5 with the decelerator and the first link member 6 transmitting the rotation of the output shaft 5a of the motor 5 with the decelerator to the first pivot shaft 2a. The linking part 4 includes the rod 51 linked with the first link member 6 and the second link member 52 linking the rod 51 and the second pivot shaft 2b. Therefore, the rotation of the driving part 3 can be efficiently transmitted to the two pivot shafts 2a, 2b. In addition, the two pivot shafts 2a, 2b can be accurately and synchronously driven rotationally.

Since the two pivot shafts 2a, 2b can be accurately and synchronously driven rotationally, it is possible to make contribution to Goal 7, i.e., "Ensure access to affordable, reliable, sustainable and modern energy for all" in Sustainable Development Goals led by the United Nations.

The engagement pins 38 are used as a means (engagement claws) for engaging the second holding member 12b to the vehicle body 101. Therefore, by simply inserting the engagement pins 38 into the respective engagement holes 39a, 39b of the vehicle body 101, respectively, the second holding member 12b can be easily engaged to the vehicle body 101.

The fixed parts 30 of the second holding member 12b protrude from the body part 20 along the radial direction. The vehicle body engagement part 36 of the second holding member 12b has the leg part 37 integrally formed at the rib 33 and the engagement pin 38 integrally formed at the tip end 37a of the leg part 37. The leg part 37 protrudes toward the side of the second support part 22 along the normal direction of the ribs 33. Accordingly, the leg part 37 protrudes outward in a direction intersecting with the axial direction from the fixed part 30.

As a result, at the time of viewing the second holding member from the top in the axial direction in which the second holding member 12b should be attached to the vehicle body 101, the engagement pins 38 can be easily recognized visually. Therefore, the second holding member 12b can be smoothly engaged to the vehicle body 101. Accordingly, the wiper device 1 can be accurately assembled within an even shorter time.

The engagement pins 38 are provided in the second holding member 12b and not provided in the first holding member 12a where the driving part 3 is disposed. Therefore, it is possible to firstly fix the first holding member 12a at the side of the first pivot shaft 2a where the driving part 3 is provided and temporarily fix the side of the second pivot shaft 2b whose weight is lighter than the side of the first pivot shaft 2a. Accordingly, since the second holding member 12b can be temporarily fixed more easily than the first holding member 12a, the wiper device 1 can be more accurately assembled within a short time.

The second holding member 12b includes the three support parts 21, 22, 23. In the three support parts 21, 22, 23, the engagement pins 38 are provided on the side surfaces (ribs 33) of the first support part 21 and the third support part 23 on the sides of the second support part 22. Spaces between the first support part 21 and the second support part 22 and between the second support part 22 and the third support part 23 are occupied spaces for attaching the second holding member 12b to the vehicle body 101.

By effectively utilizing the occupied spaces to dispose the engagement pins 38, it is possible to prevent the occupied spaces for attaching the second holding member 12b from being further enlarged due to the engagement pins 38. Therefore, the second holding member 12b can be disposed in a manner that save space as much as possible.

The second holding member 12b is formed by injection molding using resin, for example. In addition, the injection gate marks G are formed at the end parts of the base parts 30a on the sides of the outer cylindrical part 25 in the respective support parts 21, 22, 23. Meanwhile, the convex parts 34 are formed at the radially outermost side ends of the respective support parts 21, 22, 23. Therefore, in the respective support parts 21, 22, 23, the flow of the molten resin injected from the end parts on the sides of the outer cylindrical part 25 at the radially outermost side ends can be facilitated. Thus, the molten resin reaches the respective corners at the radially outermost side ends of the support parts 21, 22, 23, and the occurrence of weld can be suppressed.

The second holding member 12b is formed to be line symmetric with respect to the line L formed by connecting the center of the body part 20 in the radial direction (the axial center of the second pivot shaft 2b) and the center of the fitting convex part 29 (the second support part 22) in the circumferential direction. Therefore, for example, in the vehicle 100 with the driver's seat on the left side, the second holding member 12b can be used even in the case where the wiper device 1 is disposed in line symmetry by setting the center of the vehicle body 101 in the vehicle width direction as the center. Therefore, the second holding member 12b with high versatility can be provided.

The fitting convex part 29 is formed in the second holding member 12b, whereas the fitting part 43 fit with the fitting convex part 29 is formed in the second pivot cover 40. Therefore, when the second pivot cover 40 is mounted to the second holding member 12b, at the same time when the first cylindrical part 41 is fit with the outer cylindrical part 25, the fitting part 43 is fit with three side surfaces of the fitting convex part 29. Accordingly, the second pivot cover 40 can be easily positioned and fixed to the second holding member 12b.

In addition, the press-fit ribs 44 are formed on the inner circumferential surface of the first cylindrical part 41 in the second pivot cover 40. Therefore, the first cylindrical part 41 can be lightly pressed to the outer circumferential surface of the outer cylindrical part 25 in the second holding member 12b. Accordingly, the second pivot cover 40 can be reliably fixed to the second holding member 12b without rattling.

In the second holding member 12b, three protrusions 30e are formed on the periphery of the insertion hole 30c of the base part 30a. Therefore, when the second holding member 12b is fastened and fixed to the vehicle body 101 by using the bolts 105, the manufacturing error of the collar 31 installed to the second holding member 12b or the second holding member 12b itself can be absorbed by the buckling deformation of the protrusions 30e due to the flat washers 32 tightened together with the bolts 105. Thus, the rattling at the time of fastening and fixing the second holding member 12b to the vehicle body 101 can be prevented.

The body part 20 in the second holding member 12b is integrally formed by the inner cylindrical part 24 rotatably supporting the second pivot shaft 2b, the outer cylindrical part 25 formed to surround the periphery of the inner cylindrical part 24, and the ribs 26 linked with the inner circumferential surface 25a of the outer cylindrical part 25 and the outer circumferential surface 24a of the inner cylindrical part 24. Therefore, the mechanical strength of the body part 20 can be sufficiently ensured without forming a thick portion throughout the entire body part 20. Since there is no thick portion in the body part 20, thermal sink during resin molding of the body part 20 can be suppressed, and the molding accuracy of the body part 20 can be facilitated.

In the respective engagement holes 39a, 39b of the vehicle body 101, the first engagement hole 39a is formed in a circular shape when viewed from the axial direction. The inner diameter of the first engagement hole 39a is slightly greater than the shaft diameter of the engagement pin 38. Meanwhile, the second engagement hole 39b is formed in an elongated circular shape elongated in the vehicle width direction. Therefore, by using the first engagement hole 39a as a reference hole, a manufacture error of the vehicle body 1 or the wiper device 1 can be absorbed by using the second engagement hole 39b.

First Modified Example

<Second Holding Member>
In the following, the second holding member 12b in the first modified example is described based on FIG. 8. In the following description of the first modified example and the second modified example, the same reference symbol is labeled for a configuration same as the above embodiment, and the description thereof is omitted.

Figure 8:
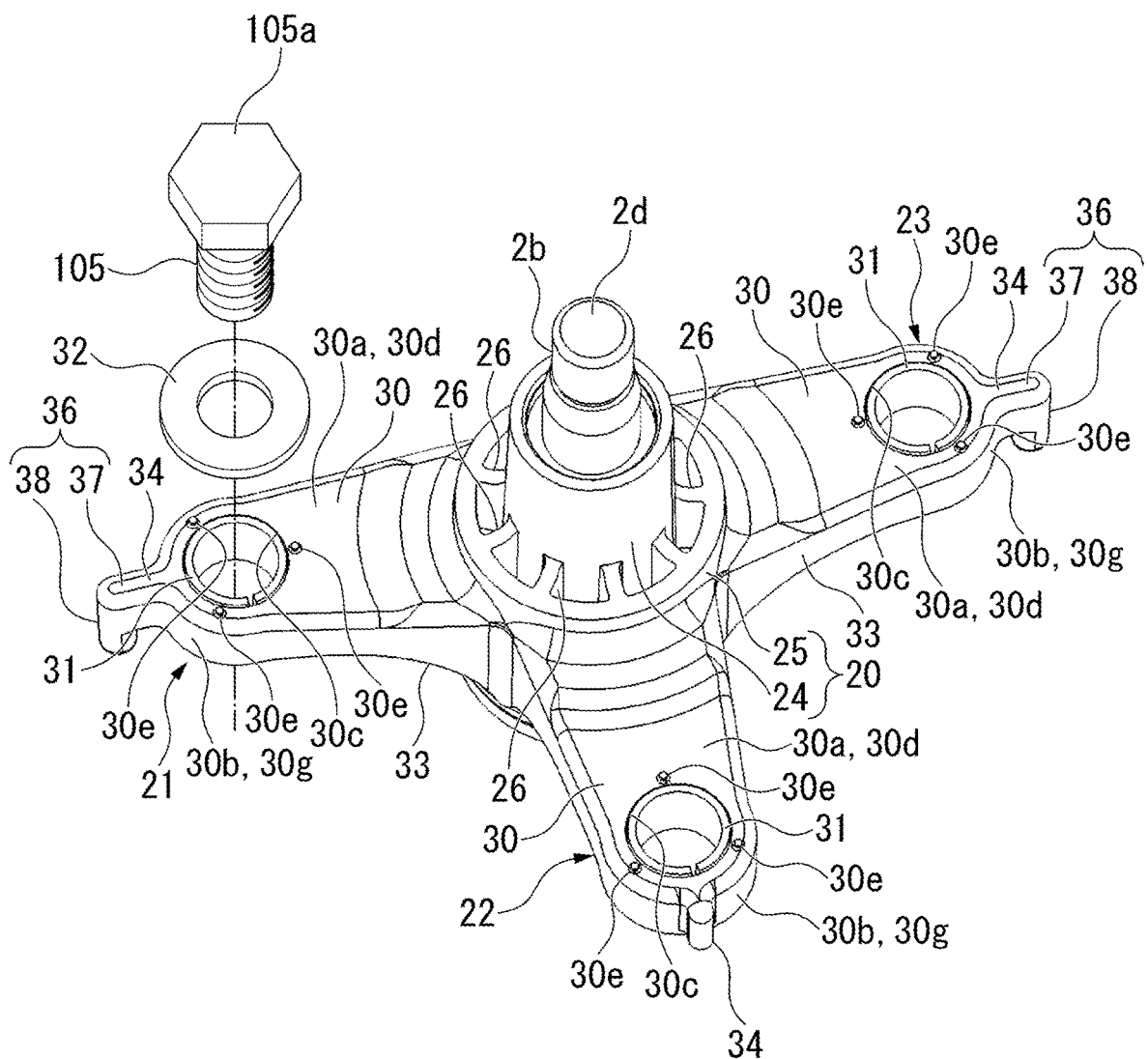
FIG. 8 is a perspective view illustrating a second holding member according to a first modified example of the invention.

FIG. 8 is a perspective view illustrating the second holding member 12b according to the first modified example.

In the above embodiment, the case where the vehicle body engagement parts 36 (the leg parts 37 and the engagement pins 38) are formed to protrude from the ribs 33 toward the second support part 22 in the first support part 21 and the third support part 23 in the second holding member 12b is described. However, the invention is not limited thereto. As shown in FIG. 8, the vehicle engagement parts 36 may also be formed at the radially outermost side ends of the first support part 21 and the third support part 23, that is, on the extending lines of the convex parts 34.

More specifically, the leg part 37 of the vehicle body engagement part 36 protrudes from the radially outer side end of the convex part 34 toward the radially outer side. An engagement pin is integrally formed at the tip end (radially outer side end) of the leg part 37.

Therefore, according to the first modified example, the effects same as the above embodiment are achieved.

Second Modified Example

<Second Holding Member>
In the following, the second holding member 12b in the second modified example is described based on FIG. 9.

Figure 9:
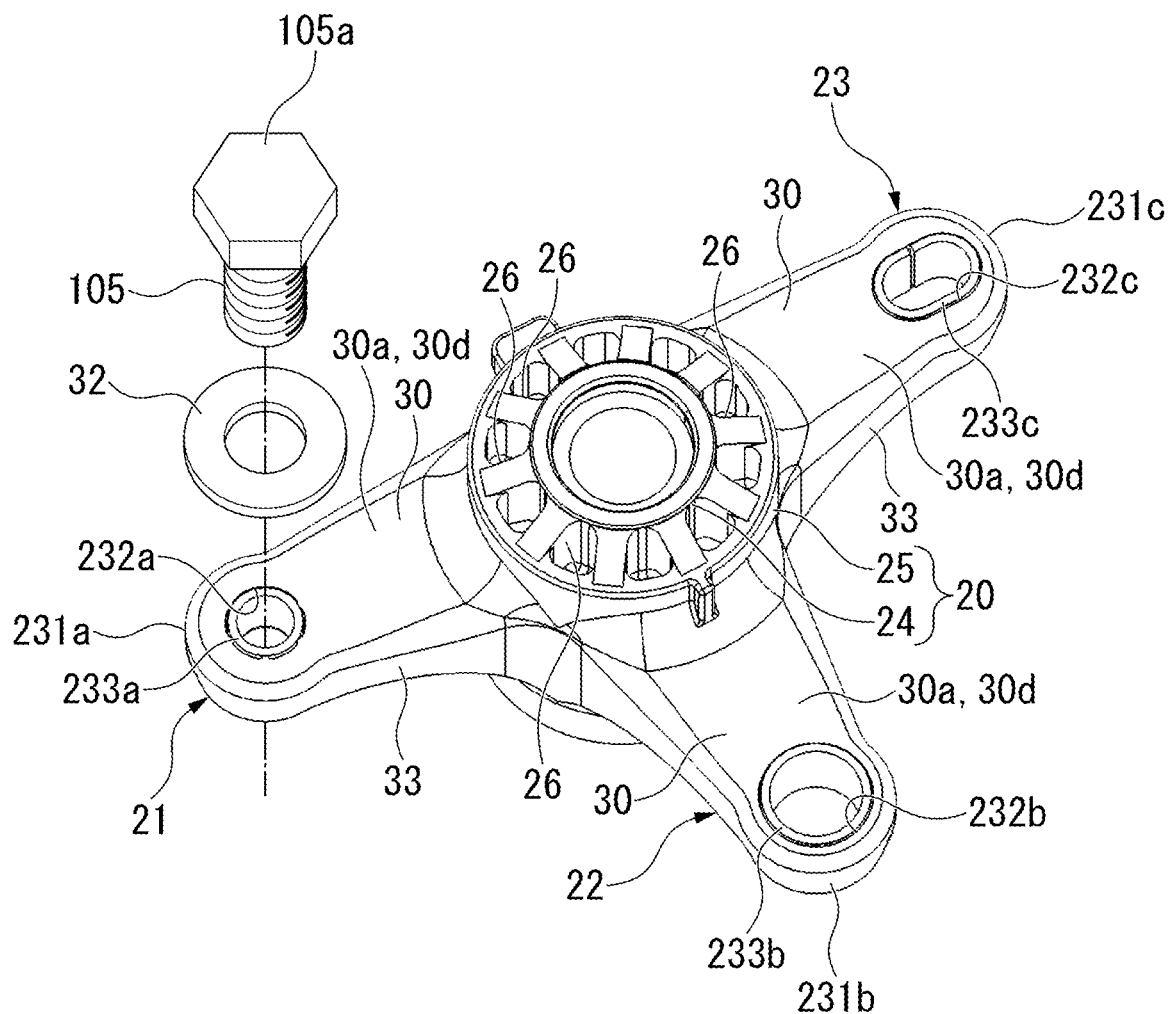
FIG. 9 is a perspective view illustrating a second holding member according to a second modified example of the invention.

FIG. 9 is a perspective view illustrating the second holding member 12b according to the second modified example.

In the above embodiment, the case where the vehicle body engagement parts 36 (the leg parts 37 and the engagement pins 38) are formed to protrude from the ribs 33 toward the second support part 22 in the first support part 21 and the third support part 23 in the second holding member 12b is described. The case where the second holding member 12b is temporarily fixed to the vehicle body 101 by inserting the engagement pins 38 of the vehicle body engagement parts 36 respectively into the engagement holes 39a, 39b of the vehicle body 101 is described.

However, the invention is not limited thereto. As shown in FIG. 9, it may also be that the vehicle engagement part 36 is not formed in the support parts 21, 22, 23, respectively. Instead, it may also be that the sizes of fixing tubes 231a, 231b, 231c formed in the respective support parts 21, 22, 23 and insertion holes 232a, 232b, 232c of the base parts 30a in communication with the respective fixing tubes 231a, 231b, 231c are different.

More specifically, the first fixing tube 231a in the first support part 21 is formed in a cylindrical shape. The first insertion hole 232a of the base part 30a in the first support part 21 is formed in a circular shape when viewed from the axial direction. The inner diameter of the first fixing tube 231a and the inner diameter of the first insertion hole 232a are slightly greater than the shaft diameter of the bolt 105 (see FIG. 3) inserted into the first fixing tube 231a and the first insertion hole 232a.

The second fixing tube 231b in the second support part 22 is formed in a cylindrical shape. The second insertion hole 232b of the base part 30a in the second support part 22 is formed in a circular shape when viewed from the axial direction. The inner diameter of the second fixing tube 231b and the inner diameter of the second insertion hole 232b are also greater than the inner diameter of the first fixing tube 231a and the inner diameter of the first insertion hole 232a.

The third fixing tube 231c in the third support part 23 is formed in an oblong cylindrical shape elongated along the vehicle width direction (radial direction) when viewed from the axial direction. The third insertion hole 232c of the base part 30a in the third support part 23 is formed in an oblong shape elongated along the vehicle width direction (radial direction) when viewed from the axial direction.

Collars 233a, 233b, 233c press-fit to the respective fixing tubes 231a, 231b, 231c are formed in correspondence with the shapes of the fixing tubes 231a, 231b, 231c that are respectively press-fit.

With such configuration, in the three fixing tubes 231a, 231b, 231c and the three insertion holes 232a, 232b, 232c, the first fixing tube 231a and the first insertion hole 232a are used as a reference hole when fastening and fixing the second holding member 12b to the vehicle body 101. Details in this regard will be described in the following.

<Assembling Method of the Wiper Device>

In the following, an assembling method of the wiper device 1 according to the second modified example is described based on FIG. 9 and with reference to FIG. 1.

As shown in FIGS. 1 and 9, firstly, the bolt 105 is inserted from the top of the first fixing tube 231a and the first insertion hole 232a in the second holding member 12b, and the bolt 105 is screwed into a female screw part (not shown) formed in the vehicle body 101. At this time, the bolt 105 is temporarily tightened to an extent that the second holding member 12b is slightly movable around the bolt 105 as the center. Accordingly, the second holding member 12b is temporarily fixed to the vehicle body 101.

In the state in which the second holding member 12b is temporarily fixed to the vehicle body 101, by using a bolt not shown herein, the first holding member 12a is fastened and fixed to the vehicle body 101. Specifically, the bolt (not shown) is inserted from the top of the bolt insertion hole 15 of the first holding member 12a. In addition, the bolt is screwed into a female screw part (not shown) formed in the vehicle body 101. Accordingly, the first holding member 12a is fastened and fixed to the vehicle body 101.

The bolt fastening operation at the time of fastening and fixing the first holding member 12a is transmitted, as vibration, to the second holding member 12b via the linking part 4. At this time, since the second holding member 12b is temporarily fixed to the vehicle body 101, the position of the second holding member 12b is not significantly displaced. In addition, the operator is not required to perform the operation of fastening the first holding member 12a to the vehicle body 101 while being concerned that the position of the second holding member 12b is displaced.

The manufacturing error of the vehicle body 101 or the wiper device 1 that occurs in the state in which the first holding member 12a is fastened and fixed to the vehicle body 101 is absorbed by the second and third fixing tubes 231b, 231c and the second and third insertion holes 232b, 232c in the second holding member 12b. That is, due to the manufacturing error of the vehicle body 101 or the wiper device 1, the second holding member 12b is rotated around the bolt 105, as the center, inserted into the first fixing tube 231a and the first insertion hole 232a. Accordingly, the manufacturing error of the vehicle body 101 or the wiper device 1 is absorbed by the second holding member 12b.

In this way, the first fixing tube 231a and the first insertion hole 232a serve as the reference hole when the second holding member 12b is fastened and fixed to the vehicle body 101. Since the inner diameter of the first fixing tube 231a and the inner diameter of the first insertion hole 232a is slightly greater than the shaft diameter of the bolt 105, the rattling with respect to the bolt 105 is also small.

The inner diameter of the second fixing tube 231b and the inner diameter of the second insertion hole 232b are also greater than the inner diameter of the first fixing tube 231a and the inner diameter of the first insertion hole 232a. In addition, the third insertion hole 232c of the base part 30a in the third support part 23 is formed in an oblong shape elongated along the vehicle width direction (radial direction) when viewed from the axial direction. Therefore, it is possible to insert the bolts 105 to the respective fixing tubes 231b, 231c and the respective insertion holes 232b, 232c at a position at which the second holding member 12b is slightly rotated from a predetermined position, and the bolts 105 are screwed into female screw parts (not shown) formed in the vehicle body 101. At this time, the three bolts 105 are all tightened.

According to the above, the second holding member 12b is fastened and fixed to the vehicle body 101, and the assembling of the wiper device 1 to the vehicle body 101 is completed.

Therefore, according to the second modified example, the effects same as the above embodiment are achieved.

It should be noted that the invention is not limited to the embodiments, and includes various modifications of the embodiments within the scope of the invention.

For example, in the above embodiments, the case where the driver's seat is on the right side in the vehicle 100 is described. However, the invention is not limited thereto. The wiper device 1 is also applicable to a vehicle 100 with the driver's seat on the left side.

In the above embodiment, the case where the motor 5 with the decelerator is adopted as the driving source of the driving part 3 is described. The case where the motor part 7 of the motor 5 with the decelerator adopts, for example, a servo motor is described. However, the invention is not limited thereto. It suffices as long as each of the pivot shafts 2a, 2b is rotationally driven. For example, it may also be that the deceleration part 8 is omitted and only the motor part 7 is provided, and various brushless motors may be adopted as the motor part 7 in place of a servo motor.

In the above embodiment, the case where, in two holding members 12a and 12b, only the second holding member 12b adopts the configuration with three support parts 21, 22, 23 is described. However, the invention is not limited thereto. The configuration with three support parts 21, 22, 23 may also be adopted in the first holding member 12a. It may also be that, in place of the second holding member 12b, only the first holding member 12a adopts the configuration with three support parts 21, 22, 23.

In the above embodiment, the case where three support parts 21, 22, 23 are provided in the second holding member 12b is described. However, the invention is not limited thereto. It suffices as long as at least two support parts are provided in the second holding member 12b. In addition, it may also be that three or more support parts 21, 22, 23 are provided in the second holding member 12b. In the case of two holding parts, it suffices as long as the engagement pins 38 are provided in the two holding parts. In the case of three or more holding parts, it suffices as long as the configuration of the fixed part 30 and the engagement pin 38 is adopted in at least two support parts.

In the above embodiment, the case where the three support parts 21, 22, 23 of the second holding member 12b protrude from the body part 20 rotatably supporting the second pivot shaft 2b toward the radially outer side is described. However, the invention is not limited thereto. It suffices as long as the three support parts 21, 22, 23 extend in a direction intersecting with the axial direction of the second pivot shaft 2b.

In the above embodiment, the case where in the three support parts 21, 22, 23 of the second holding member 12b, three protrusion 30e are formed in the base part 30a is described.

Also, the case where three press-fit ribs 35 are formed on the inner circumferential surface 30i in the fixing tubes 30b of the three support parts 21, 22, 23 is described. Also, the case where three press-fit ribs 44 are formed in the second pivot cover 40 is described. However, the invention is not limited thereto. The number of the protrusions 30e or the respective numbers of the press-fit ribs 35, 44 can be set arbitrarily.

In the above embodiment, the case where the engagement pins 38 are adopted as the means for engaging the second holding member 12b to the vehicle body 101 is described. However, the invention is not limited thereto. It suffices as long as a configuration able to engage the second holding member 12b to the vehicle body 101 is provided in the second holding member 12b. For example, in place of the engagement pin 38, a hook-shaped claw, etc., may also be adopted.

In the above embodiment, the case where the bolts 105, etc., are used as the fixing members of the respective holding members 12a, 12b to the vehicle body 101 is described. However, the invention is not limited thereto. It suffices as long as the respective holding members 12a, 12b can be fixed to the vehicle body 101. For example, in place of the bolt 105, a rivet, etc., may also be used.

In the above embodiment, the case where the first holding member 12a and the first pivot cover 17 are separate components is described. Also, the case where the second holding member 12a and the second pivot cover 40 are separate components is described. However, the invention is not limited thereto. It may also be that the respective holding members 12a, 12b and the corresponding pivot covers 17, 40 are integrally formed.

In the above embodiment, the case where the driving part 3 includes the motor 5 with the decelerator and the first link member 6 transmitting the rotation of the output shaft 5a of the motor 5 with the decelerator to the first pivot shaft 2a is described. However, the invention is not limited thereto. It suffices as long as the driving part 3 is configured to drive the first pivot shaft 2a.

In the above embodiment, the case where the linking part 4 includes the rod 51 linked with the first link member 6 and the second link member 52 linking the rod 51 and the second pivot shaft 2b is described. However, the invention is not limited thereto. It suffices as long as a configuration is linked with the driving part 3 and the second pivot shaft 2b, and the two pivot shafts 2a, 2b are synchronously driven rotationally.

In the above embodiment, the case where the vehicle engagement parts 36 having the leg parts 37 and the engagement pins 38 are provided on the side surfaces (ribs 33) of the first support part 21 and the third support part 23 on the sides of the second support part 22 is described. However, the invention is not limited thereto. In the case where the occupied space of the second holding member 12b is not considered, etc., the place where the vehicle engagement part 36 can be set arbitrarily.

What is claimed is:

1. A wiper device, comprising:
    two pivot shafts, respectively linked with wiper arms;
    a driving part, rotationally driving a first pivot shaft of the two pivot shafts;
    a linking part, linked with a second pivot shaft of the two pivot shafts and the driving part, and rotationally driving the two pivot shafts synchronously;
    a first holding member for fixing the first pivot shaft to a vehicle body; and
    a second holding member for fixing the second pivot shaft to the vehicle body,
    wherein the second holding member comprises:
        a body part, rotatably supporting the second pivot shaft; and
        a plurality of support parts, consisting of three support parts that are a first support part, a second support part, and a third support part, which are provided to protrude from the body part along a direction intersecting with an axial direction of the second pivot shaft and arranged along a circumferential direction of the body part, and the first support part, the second support part, and the third support part are disposed to be arranged in order,
    wherein each of the first support part and the third support part comprises:
        a fixed part, fixed to the vehicle body via a fixing member; and
        an engagement claw, provided at the fixed part and engaged with the vehicle body, and
    the engagement claw of the first support part is provided on a side surface of the first support part adjacent to the second support part, and the engagement claw of the third support part is provided on a side surface of the third support part adjacent to the second support part.

2. The wiper device as claimed in claim 1, wherein the driving part comprises:
    a motor, having an output shaft; and
    a first link member, linking the output shaft and the first pivot shaft, and transmitting rotation of the output shaft to the first pivot shaft,
    wherein the linking part comprises:
        a rod, wherein an end of the rod is linked with the first link member; and
        a second link member, linking another end of the rod and the second pivot shaft, and transmitting the rotation of the output shaft to the second pivot shaft via the rod.

3. The wiper device as claimed in claim 1, wherein the engagement claw has a pin part inserted into a hole formed in the vehicle body.

4. The wiper device as claimed in claim 1, wherein each fixed part protrudes from the body part along a direction intersecting with the axial direction of the corresponding pivot shaft,
    the fixed part has a leg part protruding from the fixed part toward an outer side in the direction intersecting with the axial direction of the pivot shaft, and
    the engagement claw is provided at an end part in the leg part on the outer side.

5. The wiper device as claimed in claim 1, wherein the second holding member is formed of resin, the second holding member is provided with:
    an injection gate mark, formed at an end of each fixed part on a side of the body part; and
    a convex part, formed to protrude toward a side opposite to the body part at an end of each fixed part on the side opposite to the body part.

6. A wiper device, comprising:
    two pivot shafts, respectively linked with wiper arms;
    a driving part, rotationally driving a first pivot shaft of the two pivot shafts;

a linking part, linked with a second pivot shaft of the two pivot shafts and the driving part, and rotationally driving the two pivot shafts synchronously; and two holding members, comprising a first holding member and a second holding member, for fixing the respective pivot shafts to a vehicle body, wherein the second holding member comprises:
- a body part, rotatably supporting the corresponding pivot shaft; and
- a plurality of support parts, protruding from the body part,
  wherein at least two of the support parts comprise:
  - fixed parts, fixed to the vehicle body via fixing members; and
  - engagement claws, provided at the fixed parts and engaged with the vehicle body, and the second holding member is formed of resin, and the second holding member is provided with:

an injection gate mark, formed at an end of each fixed part on a side of the body part; and a convex part, formed to protrude toward a side opposite to the body part at an end of each fixed part on the side opposite to the body part.

7. The wiper device as claimed in claim 6, wherein the driving part comprises:

a motor, having an output shaft; and a first link member, linking the output shaft and the first pivot shaft, and transmitting rotation of the output shaft to the first pivot shaft, wherein the linking part comprises:
- a rod, wherein an end of the rod is linked with the first link member; and
- a second link member, linking another end of the rod and the second pivot shaft, and transmitting the rotation of the output shaft to the second pivot shaft via the rod.

8. The wiper device as claimed in claim 6, wherein the engagement claw has a pin part inserted into a hole formed in the vehicle body.

9. The wiper device as claimed in claim 6, wherein each fixed part protrudes from the body part along a direction intersecting with an axial direction of the corresponding pivot shaft, each fixed part has a leg part protruding from the fixed part toward an outer side in the direction intersecting with the axial direction of the pivot shaft, and the engagement claw is provided at an end part in the leg part on the outer side.

* * * * *